United States Patent [19]

Affaticati

[11] Patent Number: 4,904,131
[45] Date of Patent: Feb. 27, 1990

[54] CHUCK HEAD FOR AUTOMATIC MACHINE TOOLS

[75] Inventor: Artemio Affaticati, Cadeo, Italy

[73] Assignee: Jobs S.p.a., Piacenza, Italy

[21] Appl. No.: 174,432

[22] Filed: Mar. 28, 1988

[51] Int. Cl.⁴ .................................................. B23C 1/12
[52] U.S. Cl. .................................. 409/216; 74/385;
                                                  409/201; 901/26
[58] Field of Search ............... 409/144, 201, 211, 216;
                                                  74/385, 417; 901/26

[56] References Cited

U.S. PATENT DOCUMENTS

| 1,355,662 | 10/1920 | Granat | 74/385 X |
| 3,483,796 | 12/1969 | Galgarini et al. | 409/216 |
| 3,600,967 | 8/1971 | Auguin et al. | 901/26 X |
| 4,478,540 | 10/1984 | Sachot | 409/211 |
| 4,638,550 | 1/1987 | Malzkorn | 409/144 X |
| 4,652,190 | 3/1987 | Corsi | 409/201 X |

FOREIGN PATENT DOCUMENTS

| 0121576 | 10/1984 | European Pat. Off. . |
| 0122942 | 10/1984 | European Pat. Off. . |
| 0249232 | 12/1987 | European Pat. Off. | 901/26 |

Primary Examiner—Z. R. Bilinsky
Attorney, Agent, or Firm—Notaro & Michalos

[57] ABSTRACT

A chuck head for automatic machine tools comprises a fork mounted on the end of a movable arm and an electrically driven chuck mounted between the arms of the fork. A mechanism effect angular displacements of the chuck is located within the head supporting arm and is connected to the electrically driven chuck by a transmission comprising at least two pairs of bevel gears.

3 Claims, 1 Drawing Sheet

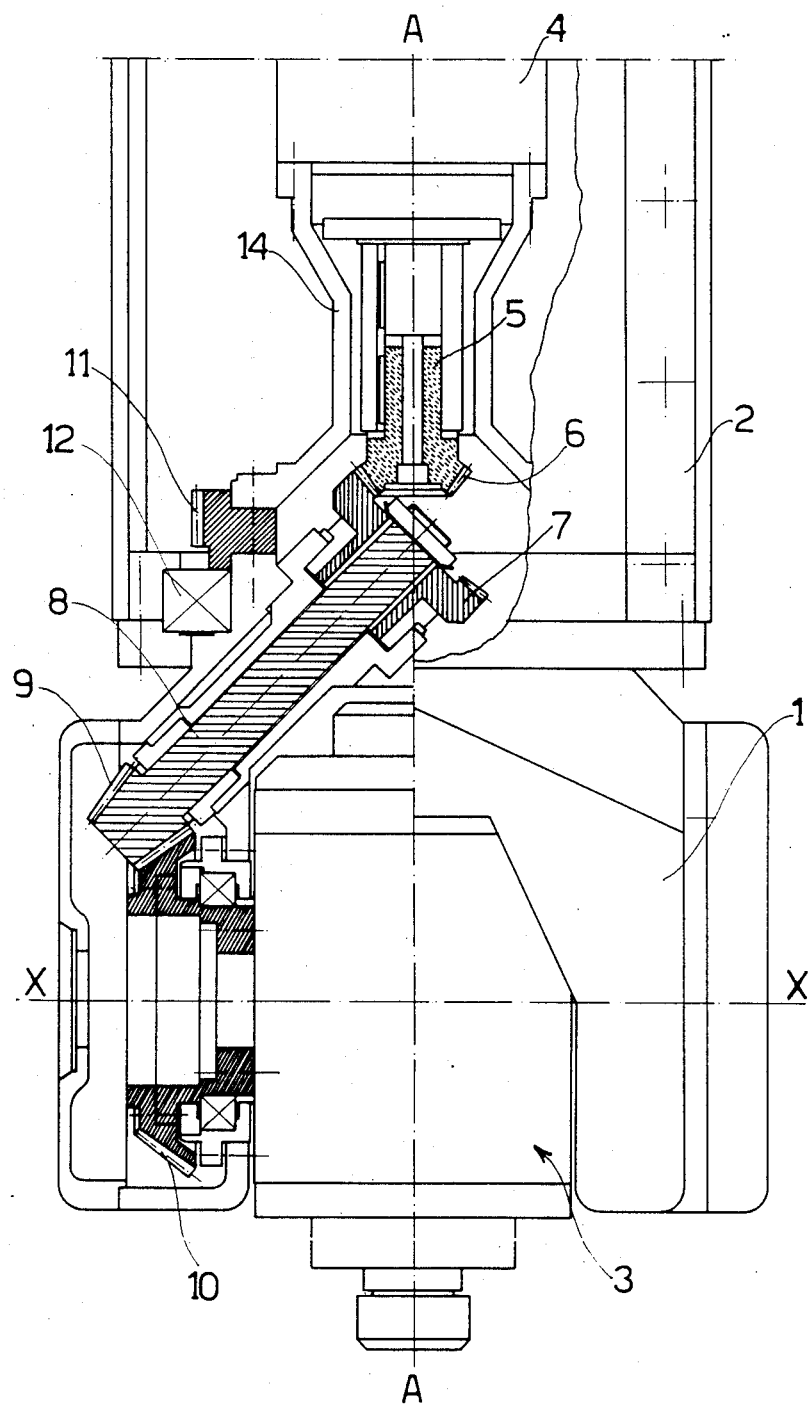

CHUCK HEAD FOR AUTOMATIC MACHINE TOOLS

FIELD AND BACKGROUND OF THE INVENTION

This invention provides a chuck head for automatic machine tools characterised by the particular arrangement of the parts whereby a unit which is extremely compact in comparison with other known similar units is obtained.

The head according to the invention is designed to be used in automatic or robot machine tools, in which the end member performs the various machining operations. As is known, these devices, which are used for high precision machining in repetitive cycles, provide a tool mounted on a support which has several degrees of freedom and whose movements are controlled by electronc means of a known type.

In some cases the tool is mounted on a head or chuck head which consists of a fork mounted at the end of an arm which can move about a number of axes, on which an electrically driven chuck is mounted.

A head of this type is described, for example, in U.S. Pat. No. 4,652,190.

The invention relates to this type of head.

The problem which must be solved arises from the difficulty which is frequently encountered when the tool must work in a confined space, and it is then desirable to have tools of the smallest possible dimensions.

In this type of equipment it is necessary to be able to impart movements about various axes, often five or more, to the tool, as a result of which it is necessary to make use of numerous transmission devices whose size constitutes a considerable obstacle to reduction of the dimensions of the whole.

In particular, in order to control angular movements of the electrically driven chuck or spindle housing with respect to the fork on which it is mounted use is made of endless screw and helical wheel devices which must necessarily be mounted within the fork where they enable the latter to rotate with respect to the supporting arm. This type of transmission is also subject to increased wear in comparison with the other components and has limited rigidity. There is therefore a need to have means which make it possible to reduce the dimensions of the unit as a whole without prejudicing its satisfactory operation while at the same time retaining the required accuracy and rigidity characteristics.

SUMMARY OF THE INVENTION

With this object this invention proposes a head in which the devices which effect angular displacements of the spindle housing with respect to the support consisting of the arms of the fork are of such a nature that the length of the entire unit can be considerably reduced while at the same time increasing its rigidity and efficiency.

This invention will now be described in detail, by way of example, with particular reference to the attached figure which provides a view of a head according to the invention in partial cross-section to reveal the devices which transmit movement to the spindle housing.

BRIEF DESCRIPTION OF THE DRAWING

The only FIGURE in the drawing is a top plan view, partly in section, of the invention.

DESCRIPTION OF THE PREFERRED EMBODIMENT

A head according to the invention comprises a fork 1 mounted on a supporting arm or shell 2, which is capable of rotating about its own axis (A—A) and an electrically driven chuck, or spindle housing indicated as a whole by 3, which is mounted between the arms of fork 1 and is able to rotate about axis X—X, which is at right angles to axis A—A.

The electrically driven chuck is of a known type and will therefore not be illustrated in detail.

Angular movements of the spindle housing about axis X—X are also controlled by a motor, not shown, which is housed within the shell 2 and transmits motion through a reduction gear of known type 4 to a shaft 5, coaxial with axis A—A. The motor and reduction gear 4 form first drive means.

A bevel gear 6 which engages a corresponding-gearwheel 7 keyed to a shaft 8 is attached to the end of shaft 5.

Shaft 8 passes through the base of fork 1 to one of the arms of the latter where a bevel gear 9, integral with shaft 8, engages a corresponding bevel gear 10, which is integral with spindle housing 3.

Movement is first subjected to a reduction as a result of reduction gear 4 and is then transmitted to spindle housing 3 by means of the pair of bevel gears 6–7 and 9–10.

The motor and the reduction gear are contained within an envelope 14 which is integral with a gearwheel 11 in turn connected to fork 1.

The base of fork 1 is mounted at the end of shell 2 by means of a thrust block or bearing 12. A second motor, also not shown, mounted within shell 2, acts through transmission devices of known type on gearwheel 11 (second drive means), causing both gearwheel 11 and fork 1 and envelope 14 integral with it, to rotate about the axis A—A.

As a consequence, both the motor, which controls angular displacements of the spindle housing or electrically driven chuck, and the devices which transmit the movement, rotate about axis A—A together with the fork.

When the unit is assembled, the position of shafts 5 and 8 is adjusted, fitting fixed spacers if necessary, in order to eliminate any play. The various components mentioned above are preferably manufactured from high alloy steel for greater resistance to wear.

The arrangement of the parts illustrated provides the following advantages:

the dimensions of the head are drastically reduced, in particular its length, in that the type of transmission developed makes it possible to place the motor controlling rotation of the spindle housing within the shell, great rigidity of the assembly is achieved in comparison with previous endless screw and helical gearwheel transmission system in that the corresponding pairs of gearwheels engage with several teeth and not just one as previously, the mechanical efficiency of the transmission is increased to values in excess of 80% against the previous 35%, a unit of extremely simple construction consisting of a few rapidly assembled parts which is easy to maintain is achieved.

Obviously the dimensions and materials used may be varied in accordance with operating requirements.

I claim:

1. A chuck head for automatic machine tools comprising:

a moveable robot arm having an arm shell (2);

a fork (1) having a pair of fork arms, rotatably mounted about an arm axis (A—A) to said arm shell;

a thrust bearing (12) connected between said arm shell and said fork for rotatably mounting said fork to said arm shell;

a spindle housing (3) with driven chuck therein, mounted for rotation about a fork axis (X—X) between said fork arms, said fork axis extending perpendicularly to said arm axis;

first drive means in said arm shell including an output shaft (5) mounted for rotation parallel to said arm axis;

a first bevel gear (6) connected to said output shaft;

a bevel gear shaft (8) extending at an angle to said arm axis into one of said fork arms;

a second bevel gear (7) connected to one end of said bevel gear shaft and meshed directly with said first bevel gear;

a third bevel gear (9) connected to an opposite end of said bevel gear shaft;

a fourth bevel gear (10) fixed to said spindle housing and meshed directly with said third bevel gear, said fourth bevel gear being mounted for rotation in one of said fork arms; and second drive means mounted in said arm shell and including a drive gear (11) connected to said fork and rotatable in said arm shell about said arm axis.

2. A chuck head according to claim 1 wherein said second bevel gear (7) and said one end of said bevel gear shaft (8) are inside said thrust bearing (12) said first drive means comprising an envelope (14) fixed to said drive gear of said second drive means, said envelope being mounted for rotation about said arm axis (A—A) in said arm shell (2).

3. A chuck head according to claim 2 including a reduction gear in said envelope, connected to said output shaft.

* * * * *